(12) United States Patent (10) Patent No.: US 7,905,079 B2
Wolters et al. (45) Date of Patent: Mar. 15, 2011

(54) ROW-INSENSITIVE FEEDING AND PICKING DEVICE FOR AN AGRICULTURAL HEADER

(75) Inventors: Norbert Wolters, Gescher (DE); Richard Wübbels, Rhede (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 2186 days.

(21) Appl. No.: 09/727,134

(22) Filed: Nov. 30, 2000

(65) Prior Publication Data
US 2001/0003237 A1 Jun. 14, 2001

(30) Foreign Application Priority Data
Dec. 9, 1999 (DE) .................. 199 59 281

(51) Int. Cl.
A01D 45/02 (2006.01)
(52) U.S. Cl. .......................................... 56/94
(58) Field of Classification Search ................ 56/94, 66, 56/98, 111, 119, 60, 102, 502, 503
See application file for complete search history.

(56) References Cited

U.S. PATENT DOCUMENTS

| 833,190 | A | * | 10/1906 | Williams | 56/98 |
| 2,777,267 | A | * | 1/1957 | Thompson | 171/24 |
| 3,049,852 | A | * | 8/1962 | Jacobson | 56/15.3 |
| 3,271,940 | A | * | 9/1966 | Ashton et al. | 56/105 |
| 3,333,405 | A | * | 8/1967 | Bulin | 56/14.6 |
| 3,894,382 | A | | 7/1975 | Jauss | 56/14.3 |
| 3,940,913 | A | * | 3/1976 | Wallenfang et al. | 56/98 |
| 4,084,396 | A | * | 4/1978 | Fritz et al. | 58/98 |
| 4,214,423 | A | * | 7/1980 | Dewey, Jr. | 56/130 |
| 4,236,369 | A | * | 12/1980 | Decoene | 56/60 |
| 4,272,947 | A | * | 6/1981 | Mizzi | 56/63 |
| RE31,063 | E | * | 10/1982 | Greiner et al. | 56/98 |
| 4,419,856 | A | * | 12/1983 | Taylor | 56/1 |
| 4,531,351 | A | * | 7/1985 | Sousek | 56/98 |
| 4,845,930 | A | * | 7/1989 | Dow | 56/113 |
| 5,060,464 | A | * | 10/1991 | Caron | 56/62 |
| 5,519,988 | A | * | 5/1996 | Copley et al. | 56/30 |
| 5,528,887 | A | * | 6/1996 | Nagy et al. | 56/94 |
| 5,651,243 | A | * | 7/1997 | Arnold et al. | 56/94 |
| 5,661,964 | A | | 9/1997 | Paulson et al. | 56/64 |
| 5,722,225 | A | * | 3/1998 | Wuebbels et al. | 56/60 |
| 5,826,415 | A | | 10/1998 | Becker | 56/66 |
| 5,911,673 | A | * | 6/1999 | Johnson | 56/94 |
| 5,916,113 | A | | 6/1999 | Johnson | 56/94 |

(Continued)

FOREIGN PATENT DOCUMENTS
DE 20 00 140 7/1974
(Continued)

OTHER PUBLICATIONS
German Report dated Jan. 23, 2008 (3 pages).

Primary Examiner — Árpád Fábián-Kovács

(57) ABSTRACT

A feeding and picking device having a rotating feeding device that is rotated about a vertical axis. The device is able to work in fields not planted in rows and is designed to grasp plant stalks and feed them into a picking device. The picking device comprises a snapping channel formed by snapping bars under which is located at least one snapping roll. The feeding device comprises a disc having fingers that overlap the snapping channel. The feeding device is therefore designed to transport the plant throughout the effective length of the picking device.

22 Claims, 13 Drawing Sheets

U.S. PATENT DOCUMENTS 6,032,444 A * 3/2000 Herron et al. .................. 56/60
6,062,011 A * 5/2000 Uhlending et al. ............ 56/119

FOREIGN PATENT DOCUMENTS

| | | |
|---|---|---|
| DE | 29 00 552 C2 | 7/1979 |
| DE | 30 29 424 | 2/1981 |
| DE | 30 29 424 A1 | 2/1981 |
| DE | 00 91 635 | 10/1983 |
| DE | 197 30 912 | 1/1999 |
| DE | 197 34 747 | 2/1999 |
| DE | 197 34 747 A1 | 2/1999 |
| FR | 74 965 | 1/1961 |
| FR | 2 599 931 | 6/1987 |
| GB | 2 012 154 | 10/1979 |
| HU | 216173 | 3/1990 |
| HU | 201637 | 8/1990 |
| WO | 99/03323 * | 1/1999 |

* cited by examiner

ROW-INSENSITIVE FEEDING AND PICKING DEVICE FOR AN AGRICULTURAL HEADER

BACKGROUND OF THE INVENTION

1. Field of the Invention

The present invention is directed to a feeding and picking device for an agricultural crop having a feeding element that has a vertical axis of rotation.

2. Description of the Prior Art

A corn picker disclosed in German Patent No. 30 29 424 A comprises a plurality of gathering snouts that define a plurality of feed channels. Each of the feed channels is provided with longitudinally extending gathering chains that overlie snapping bars defining a snapping gap. Two snapping rolls underlie the snapping bars. The plant stalks are grasped and drawn in by horizontal counterrotating snapping rolls. The snapping gap snaps ears of corn from the stalks. The gathering chains then transport the ears of corn to a screw conveyer. The plant stalks, on the other hand, are completely drawn in by the snapping rolls and deposited on the ground of the field. In many corn pickers, the plant stalks are chopped into pieces by a knife that rotates underneath the snapping rolls. The disadvantage of these prior-art corn pickers is that they are able to grasp only plants that grow in the immediate proximity of the feed channel. As a result, the transverse distance between the feed channels has to correspond relatively accurately to the spacing between the rows of plants, and the harvester has to be precisely guided.

U.S. Pat. No. 3,333,405 discloses a well-known corn picker head device which is fitted with a cutting unit. The corn picker head device comprises reciprocating knives and a conveyer screw downstream of the cutting unit. The conveyer screw interacts with a floor consisting of pairs of counterrotating rollers, between which openings are provided which run at right angles to the direction of travel. A conveyer screw feeds the ears of corn to a combine harvester, and the stalks of the corn plants are drawn in by the rotating rollers, guided through the openings, and deposited on the ground of the field. In practice, however, this device proved to be a failure.

German Patent No. 197 34 747 A discloses a corn picker for attachment to a self-propelling harvesting machine which is able to mow stalks in fields not planted in rows and to pick the ears of corn from the plants to process them separately from the remainder of the plants. To be able to grasp and mow the plants in fields not planted in rows, the device comprises a mowing unit with a rotating drum, on the peripheral edges of which recesses are provided, and a knife that rotates underneath this drum, such as known from corn picker heads. The plants are subsequently fed to conventional picker units that are mounted downstream of the mowing unit, such picker units are disclosed in German Patent No. 30 29 424 A. Although this device is able to work in fields not planted in rows, it has the disadvantage that it requires complex technical equipment and has a considerable overall length.

SUMMARY

It is an object of the present invention to provider a feeding and picking device which is able to work in fields not planted in rows, which has a simple design, and which can be safely operated.

The present invention is based on the basic idea that the feeding device can be used not only to grasp the plants in fields not planted in rows, but also to transport the plants through the picking device. This means that the feeding device ensures that the plants are transported throughout the effective length of the picking device. The effective length is the portion of the length of the picking device in which the picking device processes the plant, i.e., draws it in and separates the useful parts from the rest of the plant. As a rule, this effective length runs at right angles to the direction in which the picking device draws in the plant.

The feeding device supports the plant during the time in which it is processed by the picking device. In practice, it is supported by the feeding device at least during a relevant part of the time taken up by the picking process and not only—as in prior art represented by German Patent No. 197 34 747 A—during a threading process in which the plant is transported into the radius of action of the picking device. It is, however, conceivable that toward the end of the picking process, the plant, while still located in the picking device, could be released by the feeding device so that the latter might be able to grasp other plants, which can be implemented by means of an appropriate geometrical design of the picking device and/or by cutting off the plant.

The feeding device overlaps the snapping channel of the picking device to make it possible for the plant to be transported through the picking device. To implement this, a rotating feeding element of the feeding device may be fitted with a plurality of fingers with gaps in between for grasping and supporting plant stalks. These gaps are deep enough to ensure that during one rotation of the feeding element of the feeding device, the entire snapping channel or at least a considerable portion thereof is swept by one portion of the gaps. The depth of the gaps thus makes it possible for the plants to pass through the length of the snapping channel in spite of the fact that the plant is transported by the rotating feeding element, without being bent to a considerable degree. Thus, the plant stalk will slide in a radial direction along the surface of the finger.

In this manner, it is possible for the feeding device both to grasp the plant and to feed it to the picking device and to transport throughout its effective length. The transporting elements of the picking device required in prior art can be omitted since the feeding device carries out their function. The picking device is mounted in the immediate vicinity of the feeding device, which ensures a compact construction of the entire feeding and picking device.

The feeding device can be fitted with two feeding elements that are stacked on top of each other, with the upper feeding device having a rejecting transporting action. In this context, the term "rejecting transporting action" is defined to mean that a portion of the plant that comes within the radius of action of the feeding device is ejected to the outside rather than being drawn into the device. This rejecting transporting action can be achieved by an appropriate curvature of the fingers of the upper feeding element, which curvature extends in the opposite direction from the direction of rotation. The advantage of the rejecting transporting action is that through the interaction of an aggressive transporting action of one finger of the lower feeding element and an equally aggressive transporting action of the trailing rear surface of the finger of the upper feeding element, a wedge-type space is formed in which the stalk of the plant—in a tilted position—can be readily transported.

Relative to the feeding device, the picking device should be positioned to ensure that during processing, the feeding device could easily support and transport the plant to the picking device. It is conceivable that with respect to the direction of forward travel, the picking device could be mounted behind the feeding device; however, given a straight snapping channel of the picking device, this would mean that the snapping channel could not be sufficiently long or that problems would arise when the plants are conveyed from the feeding device to the picking device since the direction would then necessarily have to be changed. Therefore, it is recommended that the picking device be mounted on the side of the feeding device. The feeding device grasps the plants located ahead of it and transports them to its side. There, they can be grasped by the picking device without necessitating a change in direction, with this picking device extending (at least substantially) parallel to the direction of forward travel. The inlet of the picking device is preferably located in front of the axis of rotation of the feeding device, thus ensuring that sufficient space is available for the length of the picking device in front of and behind the axis of rotation of the feeding device.

The feeding elements of the feeding device can be designed so that the diameter of the upper feeding element is larger than the diameter of the lower feeding element. It is, however, also conceivable for the two diameters to be identical or for the diameter of the lower feeding element to be designed to be larger than that of the upper feeding element. When the diameters are identical, the plants are grasped approximately at the same time so that they are transported in an approximately upright position. When the diameter of the lower feeding element is larger, this lower feeding element first takes hold of the plant so that the plant is pressed against a leading finger of the upper feeding element, thereby ensuring that the plant tilts into the direction of rotation as it is being transported. When the upper feeding element has a larger diameter, the plant—depending on the transporting action of this upper feeding element—will tilt into or counter to the direction of rotation.

It is recommended, in particular for design reasons, that the lower feeding element be mounted on the same axis on which the upper feeding element is mounted. It is, however, also conceivable for the lower feeding element, in the direction of forward travel, to be mounted ahead of the upper feeding element to ensure that said lower feeding element grasps the plants before they reach the upper feeding elements.

Various alternatives are also conceivable with respect to the number of fingers of the lower and upper feeding element. Thus, the same number of fingers may be provided, or the lower feeding element may be fitted with more or fewer fingers than the upper feeding element.

As a rule, the speed of the lower feeding element will correspond to the speed of the upper feeding element. It is, however, also conceivable for the speed to be higher or lower than that of the upper feeding element.

Possible materials from which the feeding elements can be made include metal, in particular steel, but also plastic materials.

The feeding elements can be designed so as to be flexible in order to be able to avoid potential load peaks. In practice, the entire feeding element or only the fingers may be made of a resilient elastic material. Even a resilient elastic support of the fingers is conceivable.

The picking device can be constructed on the basis of a substantially well known design which comprises a snapping channel which is incorporated in a snapping bar and under which a minimum of one snapping roll is mounted parallel to the snapping channel. As a rule, however, two snapping rolls are used, between which there is a gap that runs parallel to the snapping channel and into which the plant is drawn.

The snapping channel runs either parallel to the direction of forward travel or at an angle thereto. The latter alternative has the advantage that given a specific length of the snapping channel, the overall length of the feeding and picking device is reduced.

A snapping roll, the front end region of which is suitable for grasping a plant and for drawing it into the gap that is formed by the two snapping rolls, is especially useful. The front end region is preferably equipped with a screw conveyer.

In lieu of conventional cylindrical snapping rolls, it is also possible to use conical snapping rolls. Two conical snapping rolls can be mounted at a specific angle with respect to each other; thus ensuring that a gap of constant width is maintained between said rollers.

The feeding and picking device of the present invention is used on crop harvesting machines having a plurality of feeding and picking devices. With crop harvesting machines having a large width, it is useful to provide feeding and picking devices that are symmetrical with respect to each other on both sides of a symmetrical line which generally coincides with the centerline of the crop-harvesting machine. The symmetry makes it possible to uniformly distribute the weight, thus making it possible to avoid undesirable torsional forces on the vehicle to which the crop harvesting machine is attached.

Although the feeding and picking device is designed to pick corn in fields not planted in rows, it may be useful to mount said device in a substantially known manner to the crop harvesting machine so as to be laterally adjustable. If desired, the snapping bars of adjacently located feeding and picking devices can overlap one another, thus ensuring that no undesirable gaps form when said devices are adjusted. As an alternative or in addition thereto, additional snapping bars between adjacent feeding and picking devices can close potentially remaining gaps.

And finally, it is also possible to provide adjacent feeding and picking devices that are mounted at different heights so as to reduce the minimum distance between them.

DETAILED DESCRIPTION

Figure 1:
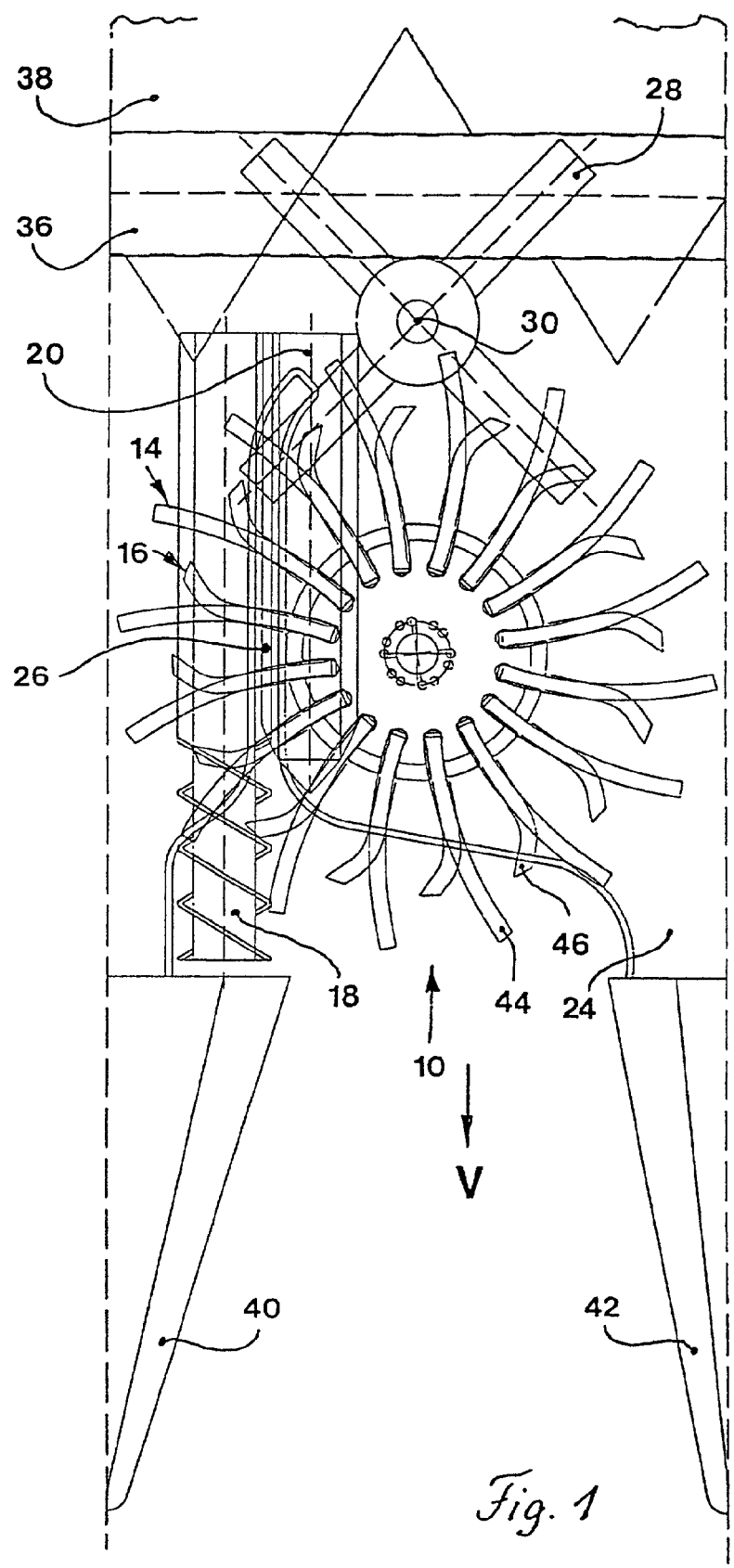
FIG. 1 is a top view of a feeding and picking device of a crop-harvesting machine.
Figure 4:
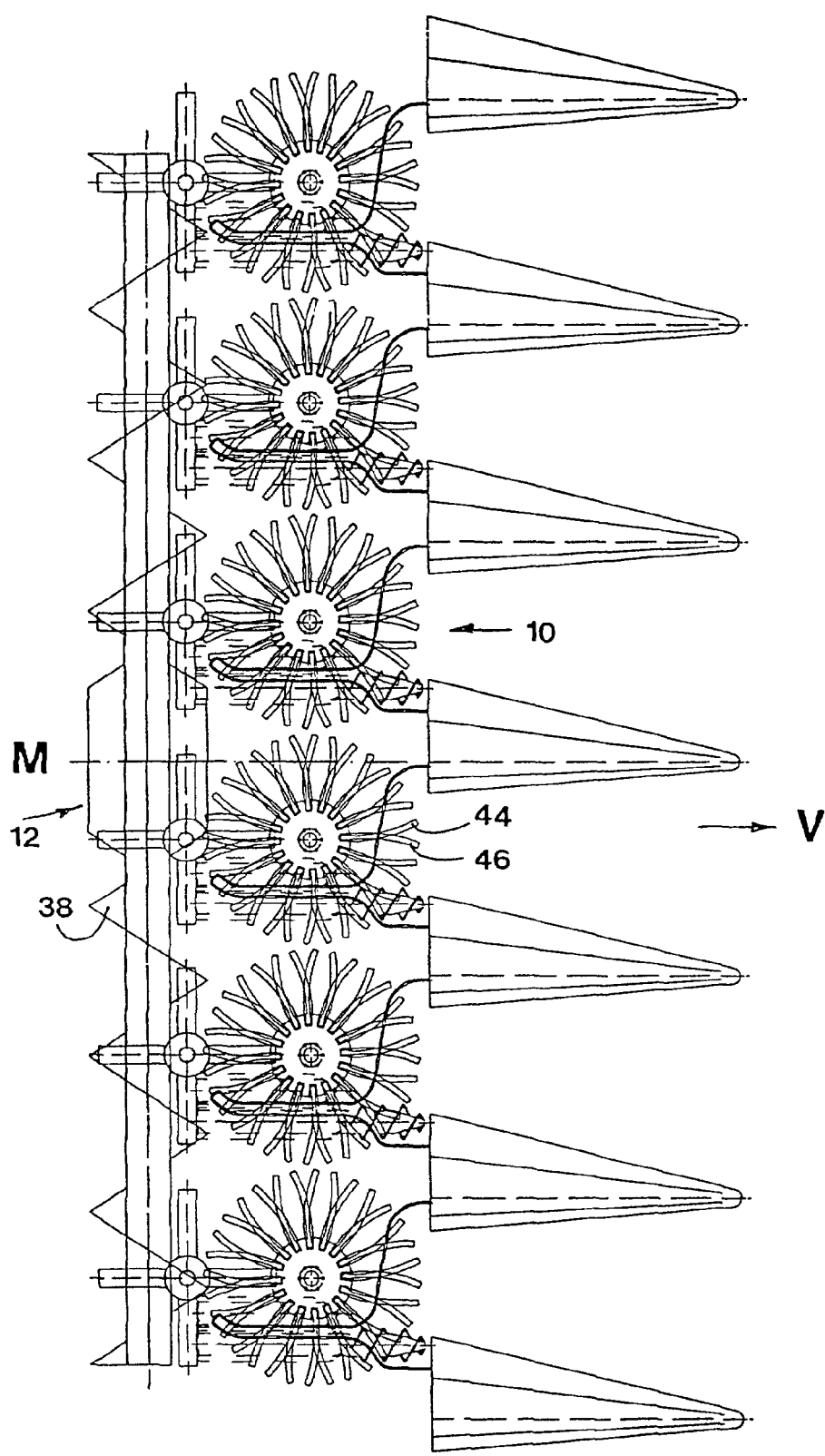
FIG. 4 is a top view of a crop-harvesting machine with a plurality of feeding and picking devices.

FIG. 1 illustrates a feeding and picking device 10 of a crop-harvesting machine. Typically, a crop harvesting machine 12, as shown in FIG. 4, comprises a plurality of feeding and picking devices 10; although, a crop harvesting machine 12 may be fitted with a single feeding and picking device 10. The feeding and picking device 10 comprises an upper feeding element 14, a lower feeding element 16, a rotary cutting knife 28, a first snapping roll 18, a second snapping roll 20, and a snapping channel 26 formed by snapping bars 24.

The upper feeding element 14 and the lower feeding element 16 grasp and draw the plant to be harvested into the crop-harvesting machine 12. These elements 14 and 16 are rotatably mounted on a vertical axis and rotate in the same direction by a drive, not shown. The upper feeding element 14 is mounted above the snapping bar 24, and the lower feeding element 16 is mounted beneath the snapping bar 24. In the illustrated embodiments, the axes of rotation of the upper feeding element 14 and the lower feeding element 16 are parallel to one another and coaxial with one another. However, it is also conceivable for these elements to be mounted in a staggered relationship to one another and/or tilted relative to one another. The axes of rotation of the lower feeding element 16 and the upper feeding element 14 are substantially vertical, but they may also be tilted slightly forward. Looking at the upper feeding element 14 and the lower feeding element 16 from the top as shown in FIG. 1, the two elements rotate in the clockwise direction. The elements 14 and 16 are rotated at the same speed.

The basic design of the upper feeding element 14 comprises a central disk 48 having substantially radially extending fingers 44. These fingers 44 are distributed along the periphery of the disk in the same plane of the disk 48. Fingers 44 have a trailing curvature curving away from the direction of rotation. As an alternative to or in addition to the curvature of fingers 44, it is also conceivable for the fingers to move radially, such as used on harvesting platforms, which can be achieved by an eccentric control. The lower feeding element 16 is also constructed to comprise a central disk 50 having substantially radially extending fingers 46. These fingers 46 are distributed along the periphery of the disk in the same plane as the disk 50. Fingers 46 have a leading curvature curving forward into the direction of rotation. The fingers 46 of the lower element 16 provide a more aggressive transporting action by better grasping the plant stalks than the fingers 44 of the upper element 14.

As shown in FIG. 1, the crop harvesting machine is also provided with gathering snouts 40 and 42 that are located upstream from the feeding elements 14 and 16 in relation to the direction of forward travel V. The gathering snouts 40 and 42 push or bend plants that are not directly in the path of feeding elements 14 and 16 inward so that they are located within the radius of action of elements 14 and 16. The edge of snapping bar 24 directs the plant stalks 22 into the radius of action of feeding elements 14 and 16. The fingers 44 and 46 define the radius of action of feeding elements 14 and 16. The radius of action is large enough so that feeding and picking device 10—during its interaction with the curved leading edge of snapping bar 24 and gathering snouts 40 and 42—is able to work in fields which are not planted in rows.

A plant stalk 22 growing in the field—which may have been directed by snapping bar 24 towards the center of the feeding and picking device—first contacts fingers 44 of the upper feeding element 14 since, in this embodiment, the upper feeding element 14 has a larger diameter than the lower feeding element 16. However, the upper feeding element 14 and the lower feeding element 16 may have equally long fingers 44 and 46, as shown in several other embodiments which will be explained in greater detail below. As a result of the trailing curvature of finger 44, the stalk is pushed outward until it has passed around the tip of finger 44. The plant stalk 22 is subsequently grasped by the leading surface of a following finger 46 of the lower feeding element 16 as feeding and picking device 10 has moved forward. Normally, it will be the next finger grasping the plant stalk, however, if the speed of forward travel is low, it may also be possible for the plant stalk to pass the tip of yet another finger 44 of the upper feeding element 14. Because of the rotation of lower feeding element 16, the plant stalk subsequently moves inward along the leading surface of finger 46. In its upper region, the plant stalk is pushed by finger 46 of lower feeding element 16 against the trailing surface of finger 44 of upper feeding element 14. In the course of this process, plant stalk 22 that has not yet been separated from the ground of the field (see FIG. 6) may be bent. Thus, one finger 46 of the lower feeding element 16 and one finger 44 of the upper feeding element 14 interact to transport a stalk while forming a wedge-type space in which the plant stalk 22 is transported.

The lower feeding element 16 cooperates with the upper feeding element 14 to move the plant stalk 22 into the radius of action of the first snapping roll 18. The first snapping roll 18 is on the other side of the snapping channel 26 from the feeding elements 14 and 16. The first snapping roll 18 extends horizontally and parallel to the direction of forward travel V. Vertically, the first snapping roll 18 is mounted between snapping bar 24 and the lower feeding element 16. The front region of the first snapping roll 18 is provided with auger flighting. The auger flighting and the feeding elements 14 and 16, draw the plant stalk 22 into the snapping channel 26 which extends at least approximately parallel to the direction of forward travel V. The snapping bar 24 forms the snapping channel 26. Relative to the direction of forward travel V, the inlet of the snapping channel is located in front of the axis of rotation of feeding elements 14 and 16. The rear region of snapping channel 26 is curved towards the feeding elements 14 and 16.

Figure 3:
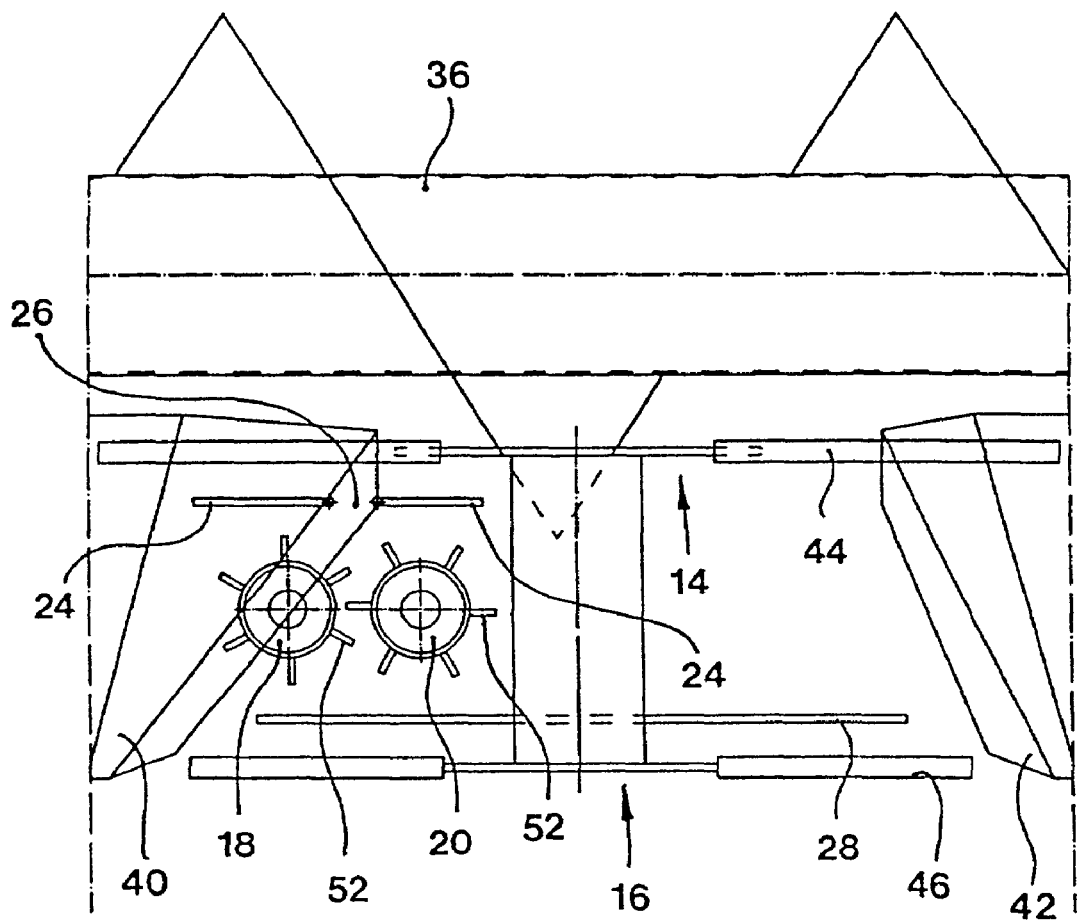
FIG. 3 is a front view of the feeding and picking device shown in FIG. 1.

The plant stalk 22 subsequently reaches the radius of action of the second snapping roll 20. The front tip of the second snapping roll is located approximately even with the axis of rotation of feeding elements 14 and 16. The second snapping roll 20 extends parallel to the first snapping roll 18. The second snapping roll is positioned between the first snapping roll 18 and the axis of rotation of feeding elements 14 and 16. The gap formed between the first and second snapping rolls 18 and 20 is located vertically beneath the snapping channel 26. The first snapping roll 18 and the second snapping roll 20 are provided with axially arranged, outward projecting gripping flutes 52, best illustrated in FIG. 3. Referring to FIG. 3, the first snapping roll 18 rotates in a clockwise direction and the second snapping roll 20 rotates in a counterclockwise direction. The first snapping roll 18 and the second snapping roll 20 cooperate and pull the plant stalk 22 downwardly. Snapping bar 24 on both sides of snapping channel 26 strips the plant stalk 22 of its useful parts, such as ears of corn 54 (see FIG. 6).

During the picking process, the upper feeding element 14 and the lower feeding element 16 ensure that the plant stalk 22 is transported throughout the length of snapping channel 26. As described earlier, the plant stalk 22 is initially caught in the wedge-type space that is formed by a finger 44 of the upper feeding element 14 and a finger 46 of the lower feeding element 16. For the major portion of the picking process, the plant stalk 22 remains in this wedge-type space. A chopping knife 28 chops the plant stalk 22 in the downstream end of snapping channel 26. The plant stalk 22 is driven by the following finger 44 of the upper feeding element 14 through snapping channel 26. The speeds of snapping rolls 18 and 20 and of feeding elements 14 and 16 are preferably chosen to ensure that the entire plant stalk 22 has been drawn downward into snapping channel 26 once the end of snapping channel 26 is reached.

Through the rotation of the fingers 44 of the rotating upper feeding element 14 and pushed by immediately following plant stalks 22, the separated useful parts of the plant are moved into a trough 38 on the rear of the feeding and picking device 10. From this trough 38 the useful parts enter into the radius of action of a screw conveyer 36 which is transverse to the direction of forward travel V. The screw conveyer 36 transports the useful parts into a conventionally known machine, not shown, for further processing, such as into a combine harvester with a threshing device or a field shredder with a chopping device or a device that transports them into a trailer or a similar vehicle.

The remainder of plant stalk 22 which is transported downward by snapping rolls 18 and 20 enters into the radius of action of a rotating four-arm chopping knife 28 which chops the remainder of the plant into pieces. Thus, the chopped remainder of the plant is deposited on the field. Plant 22—at least during the first cut separating it from the ground—is supported by the first feeding element 16 forming a counterknife. In addition, snapping rolls 18 and 20 support the plant 22 during the chopping process.

The chopping knife 28 rotates around a vertical axis 30 that is mounted between the axis of rotation of feeding elements 14 and 16 and screw conveyer 36. In the vertical direction, the chopping knife 28 is positioned between snapping rolls 18 and 20 and the lower feeding element 16. As seen in FIG. 1, chopping knife 28 rotates in a clockwise direction so that the chopped material is ejected from the side and is propelled rearwardly.

Figure 2:
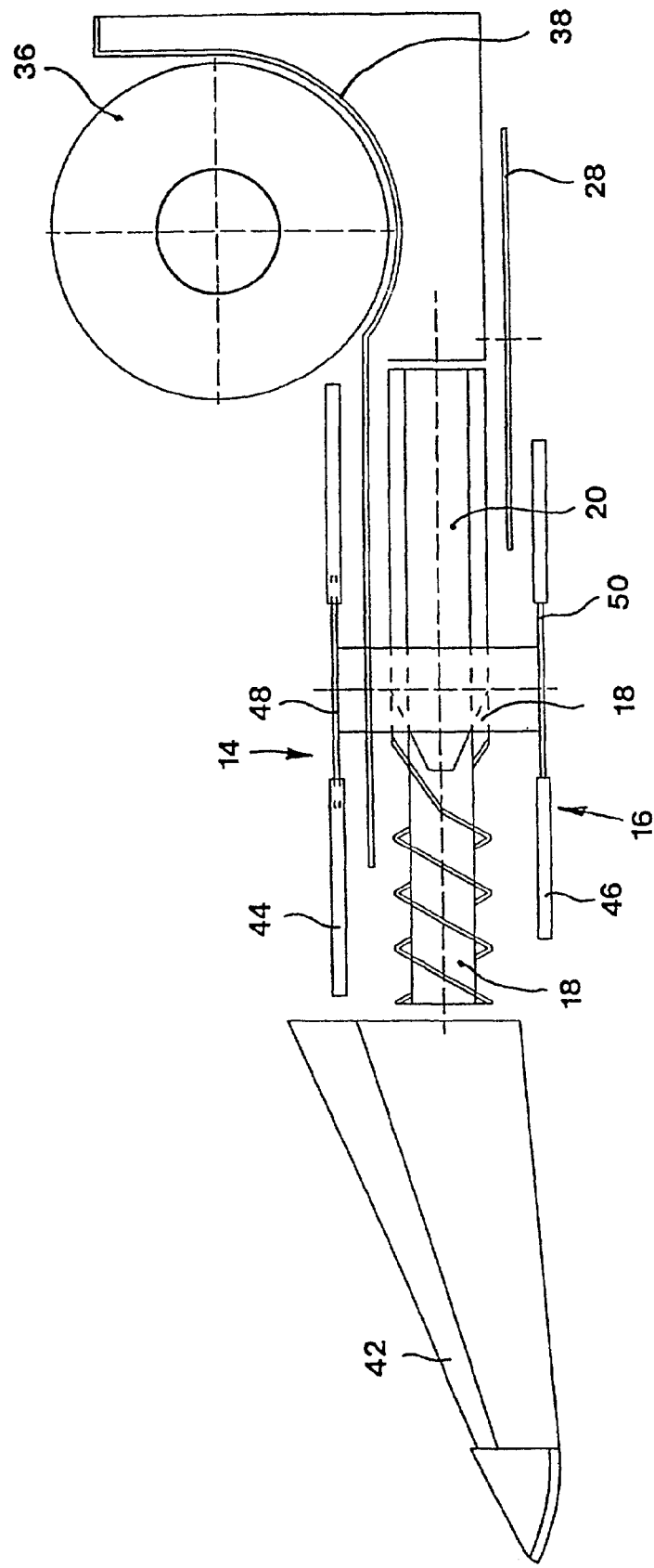
FIG. 2 is a side view of the feeding and picking device shown in FIG. 1.

FIG. 4 shows an overall view of a crop harvesting machine 12 with a total of six feeding and picking devices 10 each of which correspond to those shown in FIGS. 1 through 3. The sole difference being that the length of fingers 44 of the upper feeding element 14 (at least approximately) corresponds to the length of fingers 46 of lower feeding element 16. Relative to the direction of forward travel V, all snapping channels 26 are mounted on the right side of the axes of rotation of feeding elements 14 and 16. Screw conveyer 38 transports the useful parts of plant 22 in the direction of the center axis M of crop harvesting machine 12, from where they are transported elsewhere for further processing. It can therefore be useful if a feederhouse of a combine harvester or the feeding region of a field shredder were to be attached to the rear end of crop harvesting machine 12. The useful feature of the embodiment shown here is that all feeding and picking devices 10 have the same construction, which keeps the production cost low.

Figure 5:
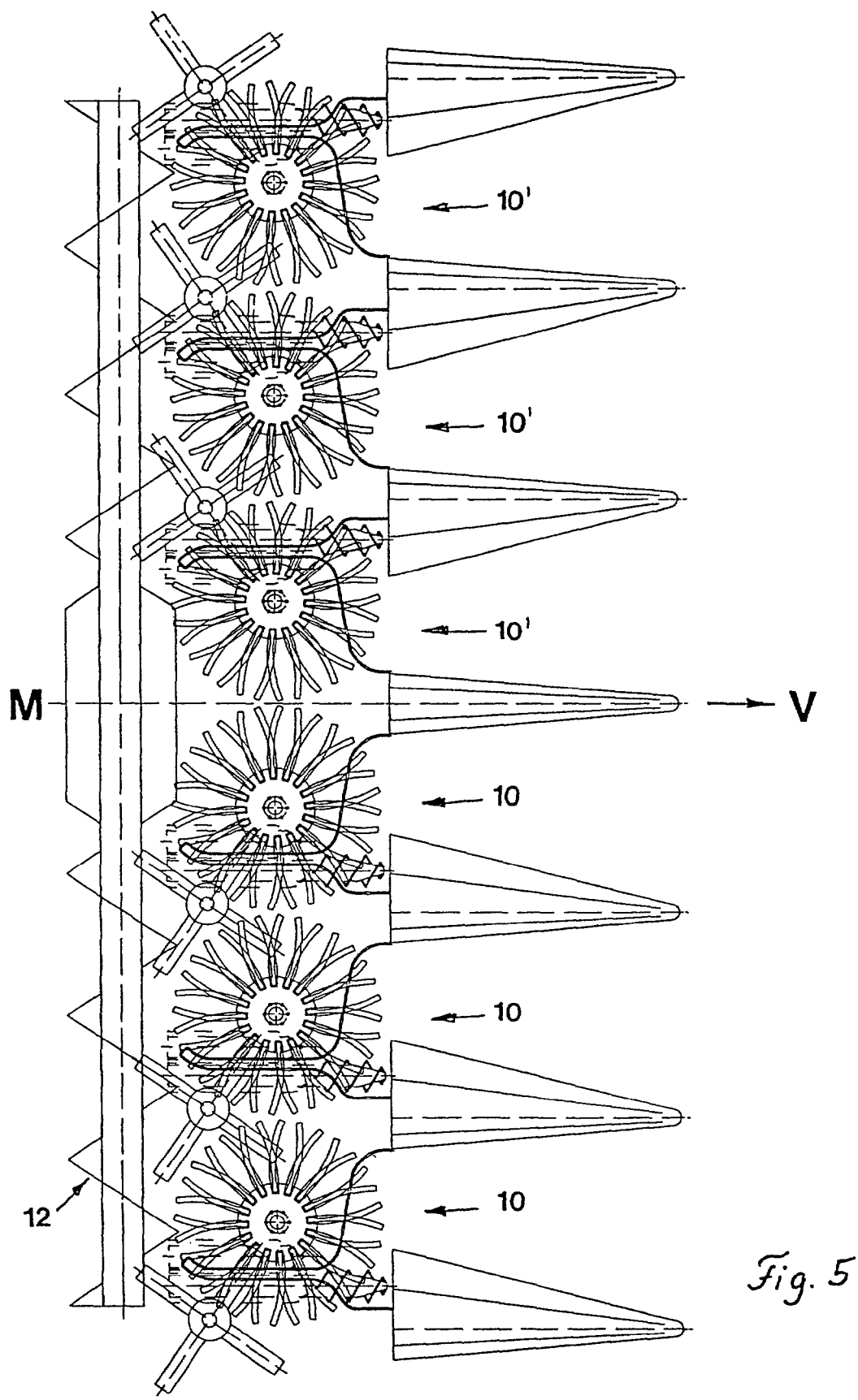
FIG. 5 is a top view of a different embodiment of a crop-harvesting machine.

In contrast, in the embodiment illustrated in FIG. 5, two different types of feeding and picking devices 10 are used. The three feeding and picking devices 10 located on the right side of the center line M of crop harvesting machine 12 are symmetrical with the three hand side devices 10'. In the left side feeding picking devices 10', the snapping channel 26 and snapping rolls 18 and 20 are mounted to the left of feeding elements 14 and 16 while in the right side feeding and picking devices 10 the snapping channel 26 and the snapping rolls 18 and 20 are mounted to the right of the feeding elements 14 and 16. The direction of rotation of feeding elements 14 and 16 differs as well. The feeding elements 14 and 16 for right side devices 10 rotate clockwise, and feeding elements 14 and 16 of left side devices 10' rotate counterclockwise. An advantage of the second embodiment is that, due to the symmetrical distribution of mass of feeding and picking devices 10,10', no lateral torsional moments act on the vehicle to which crop harvesting machine 12 is attached.

Figure 6:
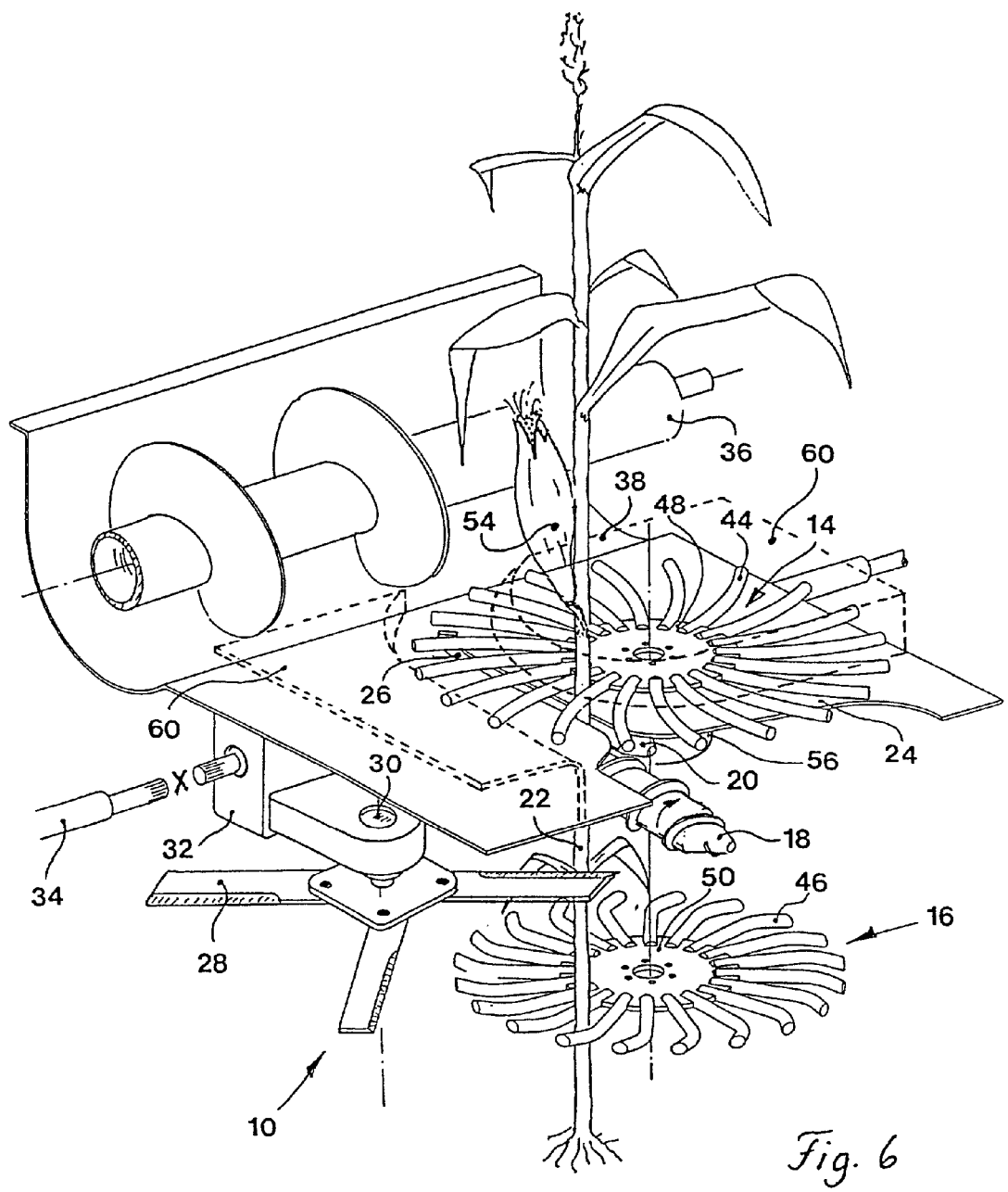
FIG. 6 is a perspective view of a different embodiment of a feeding and picking device.

FIG. 6 is a perspective view of a feeding and picking device 10 in which the position of chopping knife 28 differs from the previous embodiments. The vertical axis of rotation 30 of chopping knife 28 is located on the side of the first snapping roll 18 opposite to feeding elements 14 and 16. The axis of rotation 30 is located approximately between screw conveyer 36 and the axis of rotation of feeding elements 14 and 16. Chopping knife 28 is made to rotate by a gear unit 32 being driven by traverse driving shaft 34. Drive shaft 34 also serves to drive snapping rolls 18 and 20 and feeding elements 14 and 16 that are supported on a supporting arm 56. For reasons of clarity the intervening power transmission elements are not shown in the drawing. It is possible to use only one traverse drive shaft 34 for the entire crop harvesting machine 12 although it is useful in most cases to provide more than one drive shaft on both sides of the feeding device. As in FIGS. 1-3, the diameter of the lower feeding element 16 in FIG. 6 is smaller than that of the upper feeding element 14. A cover 60 is located above snapping bar 24 and corresponding to the snapping channel 26. The cover 60 defines a channel through which the useful parts of the plants are transported to screw conveyer 36. In addition, cover 60 protects the upper feeding element 14 against accidental contact. Cover 60 can also be used in any of the other embodiments of the present invention.

Feeding and picking device 10 is preferably attached to a support (not shown in the figures) so it can be adjusted laterally. The gear unit 32, snapping rolls 18 and 20, snapping bar 24, gathering snouts 40 and 42, and supporting arm 56 with feeding elements 14 and 16 would be mounted on a mounting device that can be adjustably positioned on a transversely extending support. Any gaps between snapping bars 24 of adjacent feeding and picking devices 10 that may form in the course of the adjustment can be covered by suitable plates or similar devices. This adjustability feature can be incorporated into all embodiments, not only in the one presented in FIG. 6.

Figure 7:
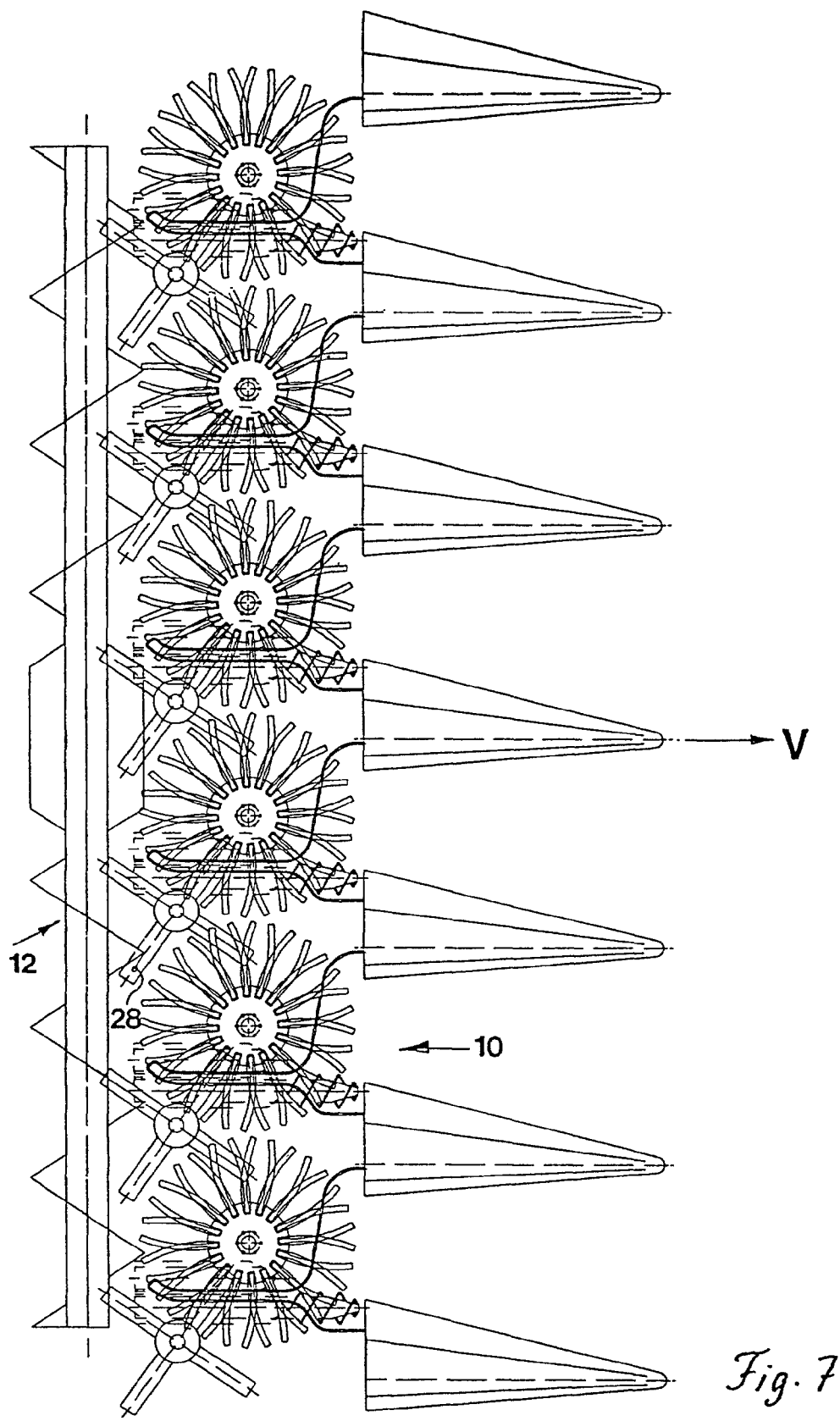
FIG. 7 is another crop harvesting machine with a plurality of feeding and picking devices that are similar to those shown in FIG. 6.

Crop harvesting machine 12 shown in FIG. 7 corresponds substantially to that shown in FIG. 4; however, the feeding and picking devices 10 used are identical to those shown in FIG. 6. The axes of rotation 30 of chopping knives 28 are therefore not mounted behind feeding elements 14 and 16, but instead are located on the side next to the first snapping roll 18. In contrast to FIG. 6, the diameters of the upper feeding elements 14 and the lower feeding elements 16 are identical.

Figure 8:
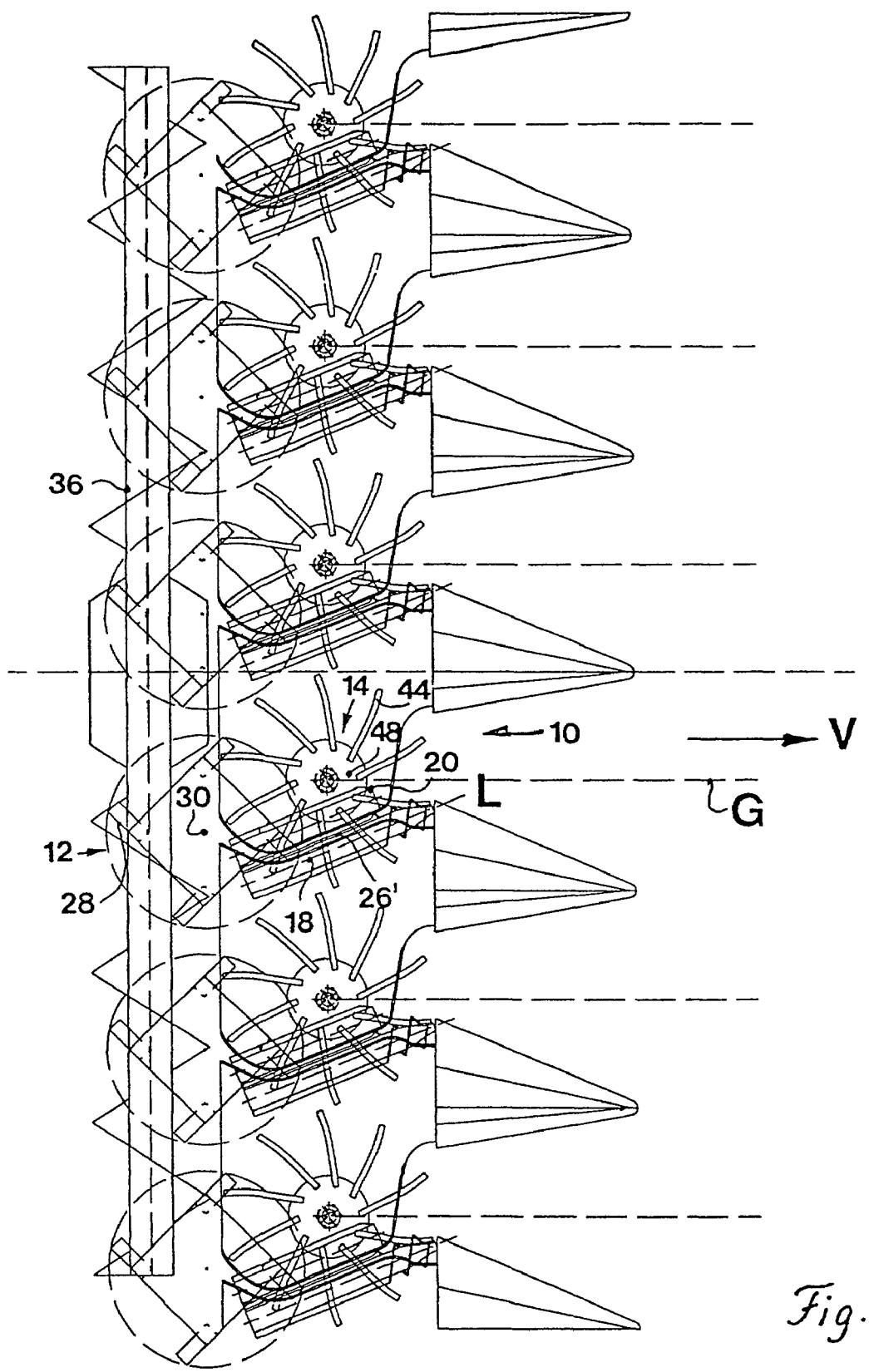
FIG. 8 is a top view of a different embodiment of a crop-harvesting machine.

FIG. 8 shows a crop-harvesting machine 12 with six feeding and picking devices 10. In this embodiment, the snapping channels 26' extend at an angle relative to the direction of forward travel V. The first snapping roll 18 and the second snapping roll 20 form an angle with the direction of forward travel V. The gap formed by the adjoining snapping rolls 18 and 20 is located under snapping channel 26'. Longitudinal axis L of snapping channel 26' forms an angle with an imaginary straight line G which extends parallel to the direction of forward travel V and through the axis of rotation of the upper feeding element. The point of intersection of longitudinal axis L with straight line G being located in front of the axis of rotation of the upper feeding element. In the snapping channel 26', plant stalks 22 are gradually transported away from straight line G. As a result of the angled snapping channel 26', the plant stalks 22 are not only transported rearwardly but also laterally. The effective length of snapping channel 26' remains the same, except that the overall length of feeding and picking device 10 is shortened, which has the advantage that the torsional force with which crop harvesting machine 12 acts upon the vehicle to which it is attached is reduced. The rear of the otherwise straight snapping channel 26', however, is again curved in the direction of straight line G.

In the fore/aft direction the axis of rotation 30 of the four-arm chopping knives 28 is located in the vicinity of the front edge of screw conveyer 36. In the transverse direction, axis of rotation 30 of chopping knife 28 is located in the vicinity of the rear end of snapping channel 26.

In FIG. 8, six identical feeding and picking devices 10 are used. The advantage is to be seen in the favorable production cost. In this context, it should be noted that for reasons of clarity, the lower feeding elements 16 are not shown FIGS. 8 and 9.

Figure 9:
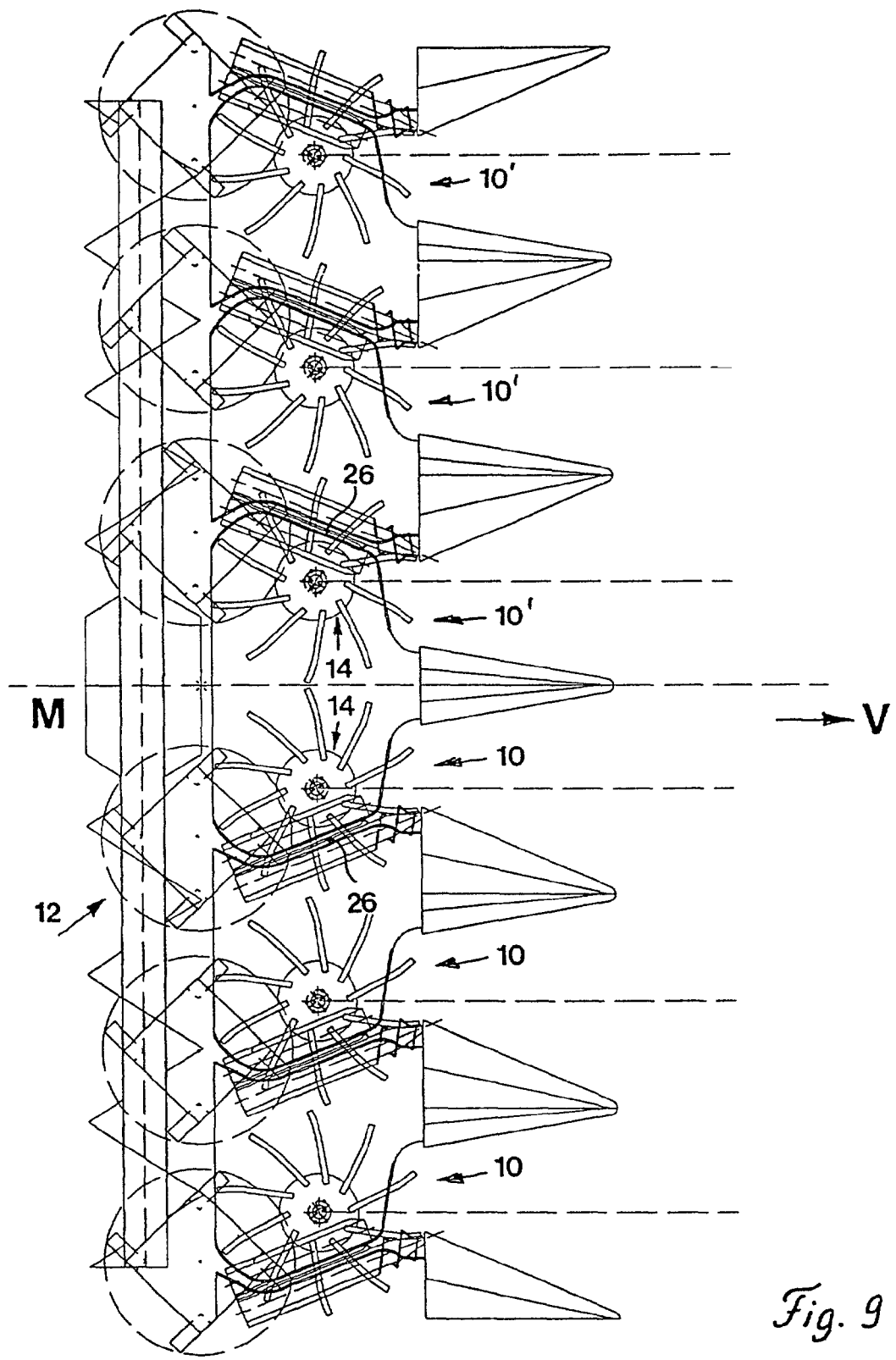
FIG. 9 is a top view of yet another embodiment of a crop-harvesting machine.
Figure 10:
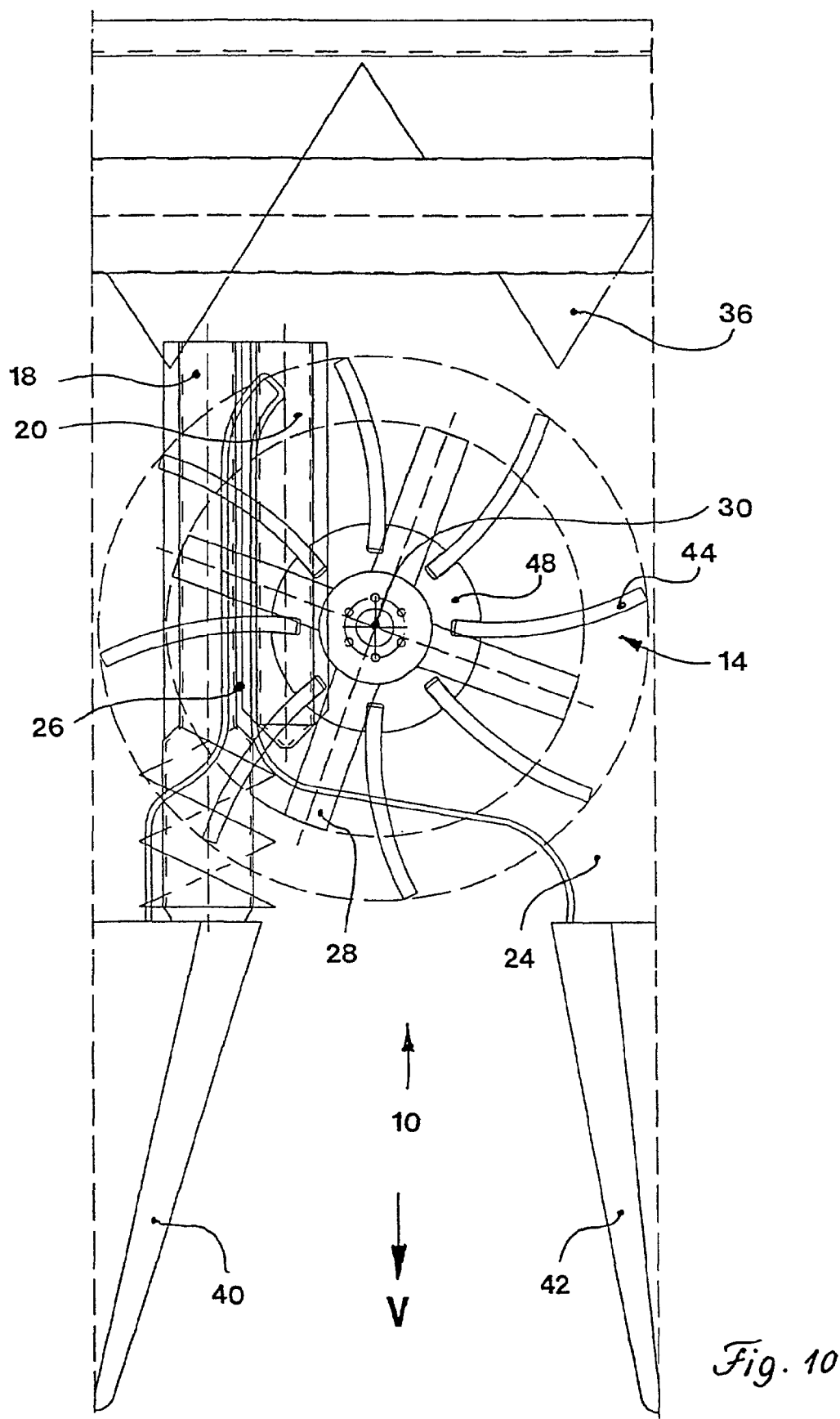
FIG. 10 is a top view of a different embodiment of a feeding and picking device.
Figure 11:
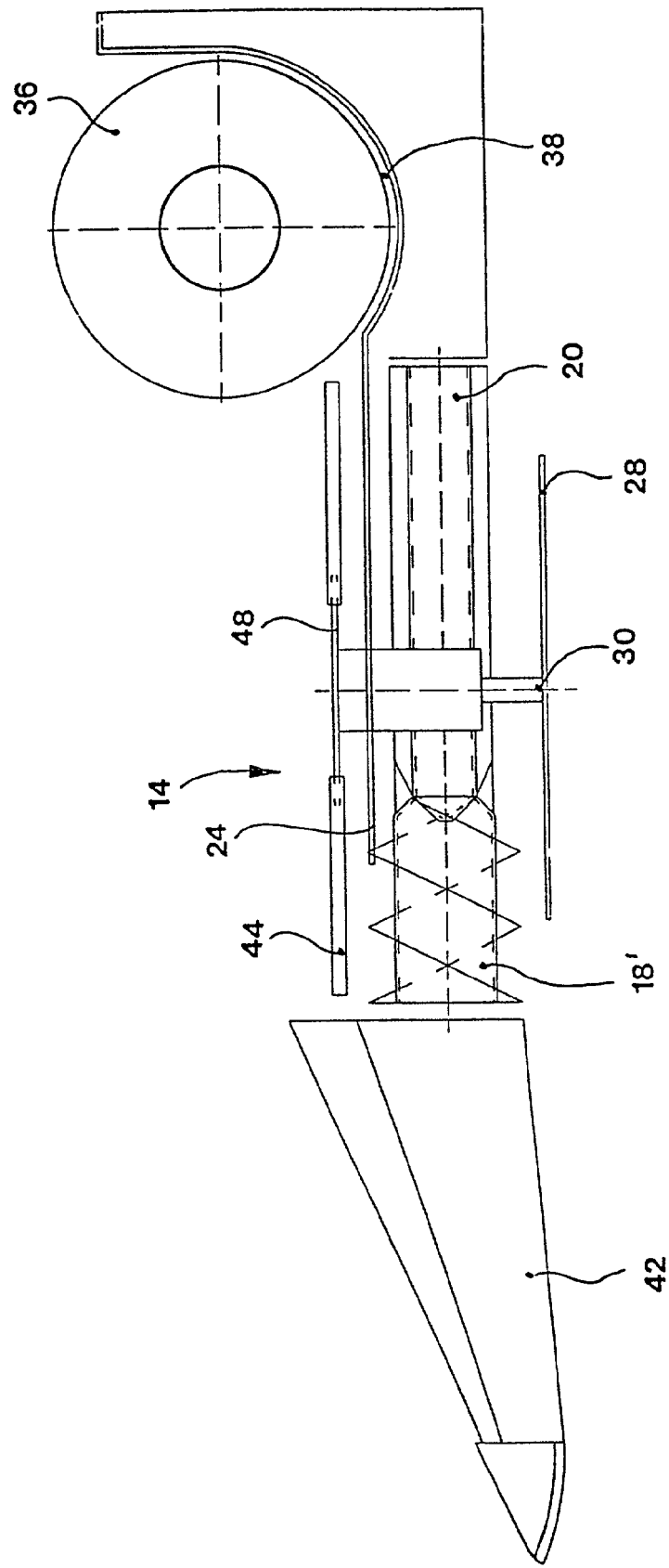
FIG. 11 is a side view of the feeding and picking device shown in FIG. 10.

The crop-harvesting machine 12 that is shown in FIG. 9 has two different types of feeding and picking devices 10. The left three feeding and picking devices 10' mounted to the left of the center line M are symmetrically arranged with respect to the right three feeding and picking devices 10 that are mounted to the right of center line M. In each of the three left feeding and picking devices 10', the snapping channel 26 is located to the left of the upper feeding elements 14. In each of the three right feeding and picking devices 10 the snapping channel is located to the right of the upper feeding elements 14. Relative to centerline M, all other structural elements of feeding and picking devices 10 and 10' are symmetrically arranged with respect to one another. The feeding and picking devices 10 correspond to those shown in FIG. 8. The feeding elements 14 and 16 for the right feeding and picking devices 10 rotate in a clockwise direction. The feeding elements 14 and 16 for the left feeding and picking devices 10' rotate in a counterclockwise direction. As with the embodiment illustrated in FIG. 5, the advantage of a symmetrical arrangement of the feeding and picking devices is that the masses on both sides of the center line are uniformly distributed, thus ensuring that no undesirable torsional forces act on the vehicle to which crop harvesting machine 12 is attached.

Figure 12:
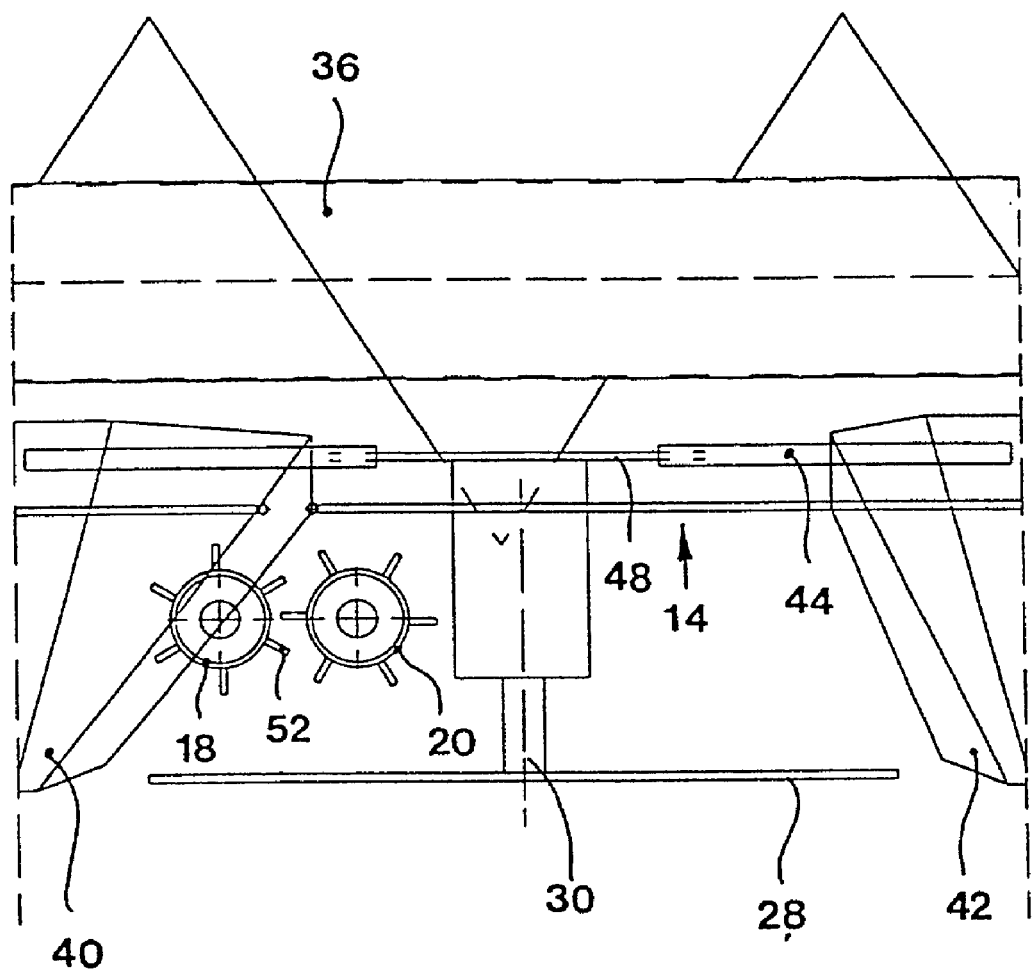
FIG. 12 is a front view of the feeding and picking device shown in FIG. 10.
Figure 13:
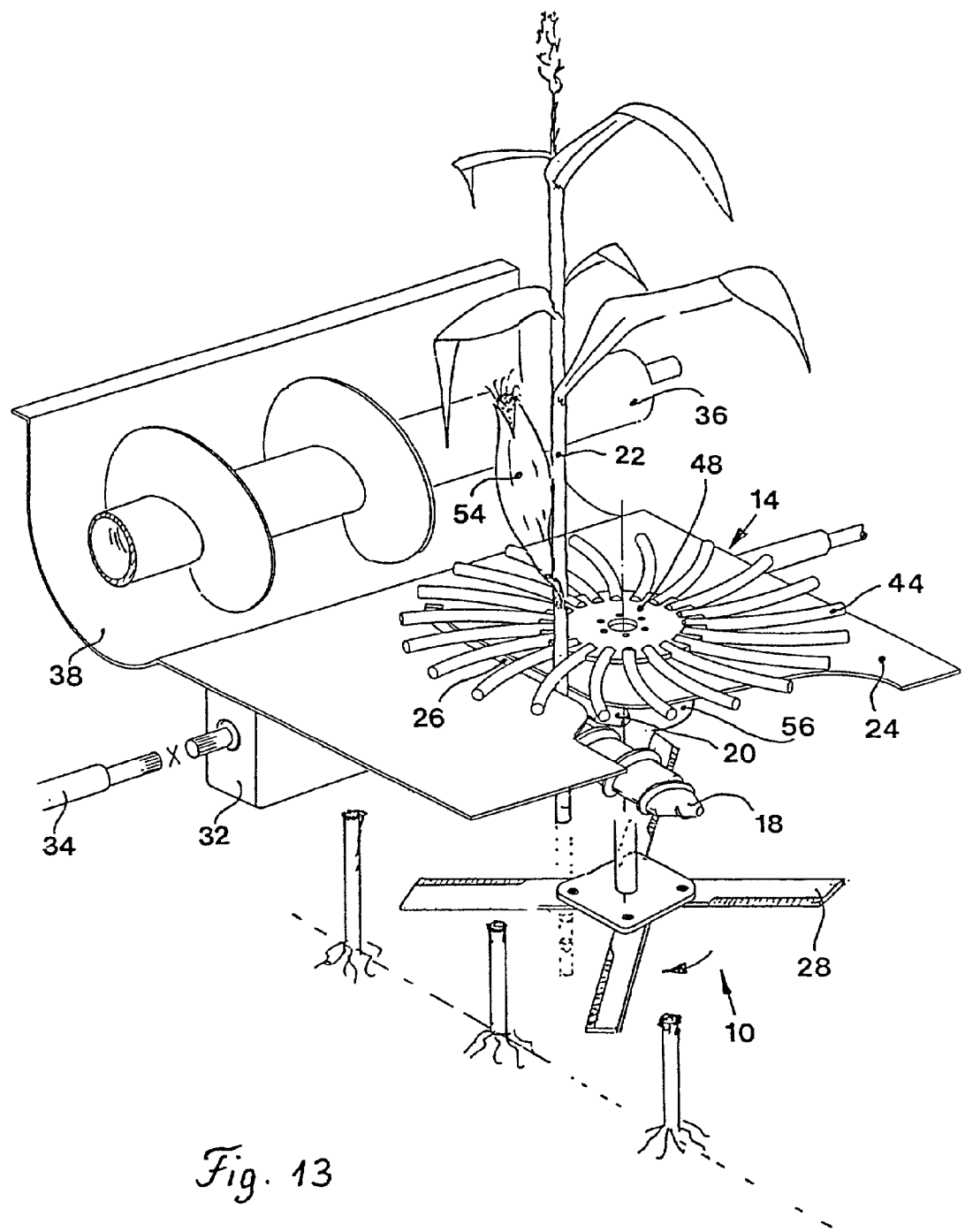
FIG. 13 is a perspective view of the feeding and picking device shown in FIGS. 10-12.

The embodiment illustrated in FIGS. 10-13 differs from the embodiment of feeding and picking device 10, mainly in that the chopping knife 28 has taken the place of the lower feeding element 16. Chopping knife 28 is therefore mounted on the same axis below the upper (and now sole) feeding element 14. In the vertical direction, the chopping knife, as seen in FIG. 12, is located beneath the snapping rolls 18 and 20.

Chopping knife 28 rotates around a vertical axis 30, around which also feeding element 14 rotates. The chopping knife 28 has a smaller diameter than that of feeding element 14. The speed of the chopping knife 28 is considerably higher than that of feeding element 14, however, the direction of rotation is the same. During harvesting the plant stalks contact the clockwise rotating feeding element 14 after they may have been bent to the side by gathering snouts 40 and 42. As a result of the rejecting transporting action of the leading edge of fingers 44, the stalks are pushed outward rather than being drawn inward. When feeding and picking device 10 further ingests the plant stalk by forward movement of the vehicle, the plant stalk is moved into the radius of action of chopping knife 28 which separates it from its root which remains in the ground. Due to its mass moment of inertia, the plant remains upright, but subsequently leans against the trailing edge of one of fingers 44. This finger rotates in the direction of snapping channel 26 in such a way that the plant is slightly tilted where it is grasped by the front end of the first snapping roll 18. The second snapping roll 20 acts as a discharging mechanism, thus ensuring that the plant, as already described for the previously explained embodiments of the present invention, is pulled through the snapping rolls 18 and 20. When the plant is in the snapping channel, it is driven by the leading edge of the following finger 44 of feeding element 14 throughout the length of snapping channel 26. The useful parts of the plant, such as ears of corn 54, are separated by snapping bar 24 and, through the action of feeding element 14, transported to trough 38, from whence screw conveyer 36 transports them to a harvester vehicle.

At the same time, the lower part of the plant is chopped off by chopping knife 28. Before it reaches snapping channel 26, the plant stalk falls gradually downward due to the force of gravity; the chopping knife chops the lower parts of the plant stalk. Once the plant has been introduced into snapping channel 26, it is gradually drawn downward by snapping rolls 18 and 20 and chopped beneath the snapping rolls by chopping knife 28.

Except for the different position and working mechanism of the chopping knife, the feeding and picking device shown in FIGS. 10-13 works in the same way as in the practical examples described previously.

The present invention should not be limited to the above-described embodiments but should be limited solely by the claims that follow.

We claim:

1. A feeding and picking device for feeding and picking a standing agricultural crop wherein individual plants in the crop are provided with plant stalks, the feeding and picking device comprising a picking device and a rotating feeding element that is rotated in a circle about a vertical axis and comprises a body with outwardly extending fingers, the rotating feeding element grasps plant stalks and directs the plant stalks to the picking device which separates useable parts from plant stalks, the picking device having an effective length, wherein rotating feeding element is designed to transport the plant throughout the effective length of the picking device and further wherein the picking device is provided with an inlet, the inlet being located in front of the vertical axis of the feeding element.

2. A feeding and picking device as defined by claim 1 wherein the picking device is provided with a snapping channel, the feeding element covers the snapping channel.

3. A feeding and picking device as defined by claim 2 wherein gaps are formed between the outwardly extending fingers, plant stalks are captured in the gaps, the gaps are sufficiently deep to ensure that they pass over the snapping channel of the picking device.

4. A feeding and picking device as defined by claim 3 wherein the feeding and picking device is provided with two rotating feeding elements, an upper feeding element and a lower feeding element, the upper feeding element has a direction of rotation, the upper feeding element is provided with outwardly extending fingers that are curved away from the direction of rotation.

5. A feeding and picking device as defined by claim 4 wherein the lower feeding element is located beneath the upper feeding element.

6. A feeding and picking device as defined by claim 5 wherein the lower feeding element has a direction of rotation that is identical to the direction of rotation of the upper feeding element.

7. The crop harvesting machine of claim 1, wherein the picking device comprises two stalk rolls having forward ends, and further wherein the axis is located behind and to the side of the two forward stalk roll ends.

8. A feeding and picking device for feeding and picking a standing agricultural crop wherein individual plants in the crop are provided with plant stalks, the feeding and picking device comprising a picking device and a rotating feeding element that is rotated in a circle about a vertical axis and comprises a body with outwardly extending fingers, the rotating feeding element grasps plant stalks and directs the plant stalks to the picking device which separates useable parts from plant stalks, wherein the feeding element is designed to support the plant stalk while it is being processed by the picking device, and further wherein the picking device is provided with an inlet, the inlet being located in front of the vertical axis of the feeding element.

9. The crop harvesting machine of claim 8, wherein the picking device comprises two stalk rolls having forward ends, and further wherein the axis is located behind and to the side of the two forward stalk roll ends.

10. A feeding and picking device for feeding and picking a standing agricultural crop wherein individual plants in the crop are provided with plant stalks, the feeding and picking device comprising a rotating feeding element that is rotated in a circle about a vertical axis and comprises a body with outwardly extending fingers, the rotating feeding element grasps plant stalks and directs the plant stalks to a picking device which separates useable parts from plant stalks, the picking device having an effective length, wherein the rotating feeding element is designed to transport the plant throughout the effective length of the picking device, wherein the picking device is provided with a snapping channel, the feeding element covers the snapping channel, wherein gaps are formed between the outwardly extending fingers, plant stalks are captured in the gaps, the gaps are sufficiently deep to ensure that they pass over the snapping channel of the picking device, wherein the feeding and picking device is provided with two rotating feeding elements, an upper feeding element and a lower feeding element, the upper feeding element has a direction of rotation, the upper feeding element is provided with outwardly extending fingers that are curved away from the direction of rotation, wherein the lower feeding element is located beneath the upper feeding element, wherein the lower feeding element has a direction of rotation that is identical to the direction of rotation of the upper feeding element, and wherein the lower feeding element is provided with outwardly extending fingers that are curved towards the direction of rotation.

11. A feeding and picking device as defined by claim 10 wherein the picking device is mounted on the side of the feeding element.

12. A feeding and picking device as defined by claim 11 wherein the picking device is provided with an inlet, the inlet being located in front of the vertical axis of the feeding element.

13. A feeding and picking device as defined by claim 12 wherein the lower feeding element has a lower element diameter and the upper feeding element has an upper element diameter, the lower element diameter is smaller than the upper element diameter.

14. A feeding and picking device as defined by claim 12 wherein the lower feeding element has a lower element diameter and the upper feeding element has an upper element diameter, the lower element diameter is equal to the upper element diameter.

15. A feeding and picking device as defined by claim 12 wherein the lower feeding element is provided with a lower vertical axis and the upper feeding element is provided with an upper vertical axis, the lower vertical axis and the upper vertical axis are coaxial.

16. A feeding and picking device as defined by claim 12 wherein the upper feeding element has the same number of fingers as the lower feeding element.

17. A feeding and picking device as defined by claim 12 wherein the picking device further comprises a snapping bar and at least one snapping roll, the at least one snapping roll extends parallel to the snapping channel and is mounted under said snapping bar.

18. The feeding and picking device as defined by claim 17 wherein said feeding and picking device has a direction of travel, the snapping channel extends parallel to the direction of travel.

19. The feeding and picking device as defined by claim 17 wherein said feeding and picking device has a direction of travel, the snapping channel extends at an angle to the direction of travel.

20. A crop harvesting machine having at least two feeding and picking devices, wherein each feeding and picking device feeds and picks a standing agricultural crop wherein individual plants in the crop are provided with plant stalks, the feeding and picking device comprising a rotating feeding element that is rotated in a circle about a vertical axis and comprises a body with outwardly extending fingers, the rotating feeding element grasps plant stalks and directs the plant stalks to the picking device which separates useable parts from plant stalks, the picking device having an effective length, wherein the rotating feeding element is designed to transport the plant throughout the effective length of the picking device and further wherein the picking device is provided with an inlet, the inlet being located in front of the vertical axis of the feeding element.

21. A crop harvesting machine as defined by claim 20 having a symmetrical line, feeding and picking devices are symmetrically arranged with respect to each other about the symmetrical line.

22. The crop harvesting machine of claim 20, wherein the picking device comprises two stalk rolls having forward ends, and further wherein the axis is located behind and to the side of the two forward stalk roll ends.

* * * * *